(12) United States Patent
Mizutani

(10) Patent No.: US 12,211,234 B2
(45) Date of Patent: Jan. 28, 2025

(54) ESTIMATION METHOD, ESTIMATION APPARATUS AND PROGRAM

(71) Applicant: NIPPON TELEGRAPH AND TELEPHONE CORPORATION, Tokyo (JP)

(72) Inventor: Shin Mizutani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 408 days.

(21) Appl. No.: 17/783,601

(22) PCT Filed: Dec. 10, 2019

(86) PCT No.: PCT/JP2019/048228
§ 371 (c)(1),
(2) Date: Jun. 8, 2022

(87) PCT Pub. No.: WO2021/117120
PCT Pub. Date: Jun. 17, 2021

(65) Prior Publication Data
US 2023/0005182 A1    Jan. 5, 2023

(51) Int. Cl.
*G06T 7/73* (2017.01)
*G06V 10/766* (2022.01)
*G06V 10/77* (2022.01)

(52) U.S. Cl.
CPC .............. *G06T 7/75* (2017.01); *G06V 10/766* (2022.01); *G06V 10/7715* (2022.01)

(58) Field of Classification Search
None
See application file for complete search history.

(56) References Cited

U.S. PATENT DOCUMENTS

| | | | |
|---|---|---|---|
| 2011/0206274 A1* | 8/2011 | Tateno | G06T 7/75 382/154 |
| 2020/0234466 A1* | 7/2020 | Holzer | G06T 7/75 |
| 2022/0026981 A1* | 1/2022 | Fukumoto | G02B 27/0101 |

OTHER PUBLICATIONS

Murase et al. (1994) "3D Object Recognition from Appearance—Parametric Eigenspace Method" IEICE Transactions D-II, vol. J77-D-II, No. 11, pp. 2179-2187.

(Continued)

*Primary Examiner* — Leon Viet Q Nguyen

(57) ABSTRACT

An estimation step according to an embodiment causes a computer to execute: a calculation step of using a plurality of images obtained by a plurality of imaging devices imaging a three-dimensional space in which a plurality of objects reside, to calculate representative points of pixel regions representing the objects among pixel regions of the images; a position estimation step of estimating positions of the objects in the three-dimensional space, based on the representative points calculated by the calculation step; an extraction step of extracting predetermined feature amounts from image regions representing the objects; and an attitude estimation step of estimating attitudes of the objects in the three-dimensional space, through a preliminarily learned regression model, using the positions estimated by the position estimation step, and the feature amounts extracted by the extraction step.

20 Claims, 7 Drawing Sheets

(56) References Cited

OTHER PUBLICATIONS

Tamaki et al. (2008) "Representing pose by spherical functions for pose estimation" Image Recognition and Understanding Symposium (MIRU2008), Jul. 29, 2008, pp. 1134-1141.

Nishimura et al. (2010) "Department of Mechanical and Information Engineering Exercise, Media Interface (1) Camera Interface" literature, [online] website: http://www.cyber.t.u-tokyo.ac.jp/~kuni/enshu2010/enshu2010mi1.pdf.

Shin Mizutani (2019) "Estimating the three-dimensional position and orientation of multiple allogeneic ellipsoidal rigid bodies from images" 22nd Image Recognition and Understanding Symposium (MIRU2019), Jul. 29, 2019.

* cited by examiner

ESTIMATION METHOD, ESTIMATION APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2019/048228, filed on 10 Dec. 2019, the disclosure of which is hereby incorporated herein by reference in its entirety.

TECHNICAL FIELD

The present invention relates to an estimation method, an estimation device, and a program.

BACKGROUND ART

In the field of computer vision (CV), a method has been known that calculates the attitude of an object in a three-dimensional space from two-dimensional images. For example, the parametric eigenspace method (e.g., Non-Patent Literature 1), a method of estimating the attitude using spherical functions (e.g., Non-Patent Literature 2) and the like have been known. Besides these methods, a method has also been known that captures points on the surface of a three-dimensional object, and calculates an attitude matrix representing the attitude of the three-dimensional object using the positions of the points (e.g., Non-Patent Literature 3). Moreover, it can be imagined that a regression model is learned on the basis of pair data on images and physical quantities representing the attitude, and the attitude is estimated.

CITATION LIST

Non-Patent Literature

Non-Patent Literature 1: Hiroshi MURASE, S. K. Nayar, "3D Object Recognition from Appearance—Parametric Eigenspace Method", The transactions of the Institute of Electronics, Information and Communication Engineers, D-II, vol. 7, no. 11, pp. 2179-2187, November 1994.

Non-Patent Literature 2: Toru TAMAKI, Toshiyuki AMANO, Kazufumi KANEDA, "Representing pose by spherical functions for pose estimation", Meeting on Image Recognition and Understanding (MIRU2008), pp. 1134-1141, 2008.

Non-Patent Literature 3: Kunihiro NISHIMURA, Masamichi SHIMOSAKA, Tomohiro TANIKAWA, Mamoru NAKAMURA, Masayuki TANAKA, Yoshiyuki NAKAGAKI, "Department of Mechano-Informatics, Seminar, Media Interface (1), Camera Interface", Internet <URL: http://www.cyber.t.u-tokyo.ac.jp/~kuni/enshu2010/enshu2010mi1.pdf>

SUMMARY OF THE INVENTION

Technical Problem

Unfortunately, since the methods described in Non-Patent Literature 1 and Non-Patent Literature 2 use, for example, images themselves for attitude estimation, the estimation accuracy is sometimes reduced by a certain change in illumination condition and the like. For example, the method described in Non-Patent Literature 3 requires capturing points on a surface of a three-dimensional object. Accordingly, in case these points cannot be observed, for example, the attitude cannot be estimated.

For example, the method of using a regression model is accompanied by specific selection of input and output data for learning, a specific structure and mechanism of a regression model and the like. Accordingly, it is difficult to achieve this method. For example, in case part of input data includes a defect, it is impossible to estimate the attitude by a single regression model. In order to achieve attitude estimation even with a defect at part of input data, many regression models in accordance with defect situations are required to be prepared.

Furthermore, even if the methods described in Non-Patent Literature 1 and Non-Patent Literature 2 and the method of using a regression model are combined, it is impossible to estimate the attitudes of multiple objects that cannot be discriminated from each other.

An embodiment of the present invention has been made in view of the points described above, and has an object to accurately estimate the positions and attitudes of objects in a three-dimensional space.

Means for Solving the Problem

To achieve the above object, an estimation step according to an embodiment causes a computer to execute: a calculation step of using a plurality of images obtained by a plurality of imaging devices imaging a three-dimensional space in which a plurality of objects reside, to calculate representative points of pixel regions representing the objects among pixel regions of the images; a position estimation step of estimating positions of the objects in the three-dimensional space, based on the representative points calculated by the calculation step; an extraction step of extracting predetermined feature amounts from image regions representing the objects; and an attitude estimation step of estimating attitudes of the objects in the three-dimensional space, through a preliminarily learned regression model, using the positions estimated by the position estimation step, and the feature amounts extracted by the extraction step.

Effects of the Invention

The positions and attitudes of objects in the three-dimensional space can be accurately estimated.

DESCRIPTION OF EMBODIMENTS

Hereinafter, an embodiment of the present invention is described. In this embodiment, an estimation device 10 is described that can accurately estimate the positions and attitudes of three-dimensional objects using two-dimensional images obtained by imaging the three-dimensional objects. Note that hereinafter, "two-dimensional" is also represented as "2D" and "three-dimensional" is also represented as "3D".

Here, in this embodiment, it is assumed that multiple 2D images (hereinafter also simply represented as "images") obtained by imaging multiple 3D objects (hereinafter also simply represented as "objects") of an identical type in a closed space are used to estimate the positions and attitudes of these objects. It is herein assumed that the total number of objects can be easily estimated from the images. That is, it is assumed that the maximum number among the numbers of object images in the respective images can be estimated as the total number of objects. If each object is imaged in an environment where the object is less likely to mask the other objects, this estimation is correct. Note that the object image is a combined pixel region that represents an object projected in an image.

The object is assumed as, for example, a rigid body that is an ellipsoid having three axes different in length from each other. For example, a living thing such as a fish in an aquarium, an insect flying around in a room, a drone or the like is assumed as such an object. Note that, for example, a living thing is not a rigid body in a strict sense. It is however assumed that a living thing can be approximated as a rigid body. It is assumed that the three-dimensional shape can also be approximated as an ellipsoid having three axes different in length from each other.

The 3D position P of an object is represented by 3D absolute coordinates (X, Y, Z). A representative point, such as the 3D barycenter, of the object is assumed as the 3D position P. The 3D attitude of the object is represented by an attitude matrix (or rotation matrix) $R \in \mathbb{R}^{3 \times 3}$. Note that, according to this embodiment, the representative point of the object is the 3D barycenter. The object is assumed to have an equal density, and the 3D barycenter is assumed as the volume center point.

<Overall Configuration>

Figure 1:
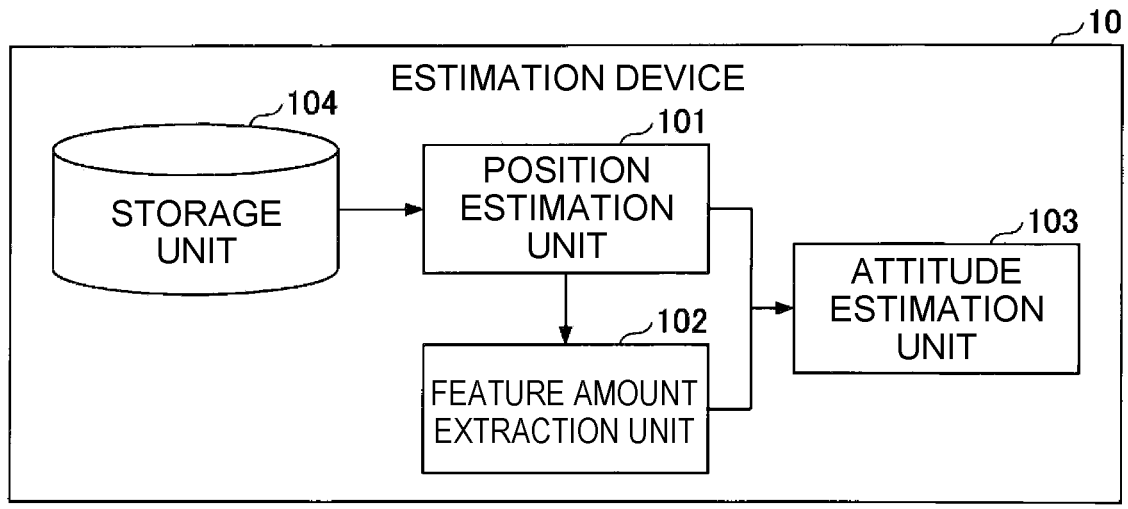
FIG. 1 shows an example of an overall configuration of an estimation device according to this embodiment.

First, an overall configuration of the estimation device 10 according to this embodiment is described with reference to FIG. 1. FIG. 1 shows an example of the overall configuration of the estimation device 10 according to this embodiment.

As shown in FIG. 1, the estimation device 10 according to this embodiment includes a position estimation unit 101, a feature amount extraction unit 102, an attitude estimation unit 103, and a storage unit 104.

Figure 2:
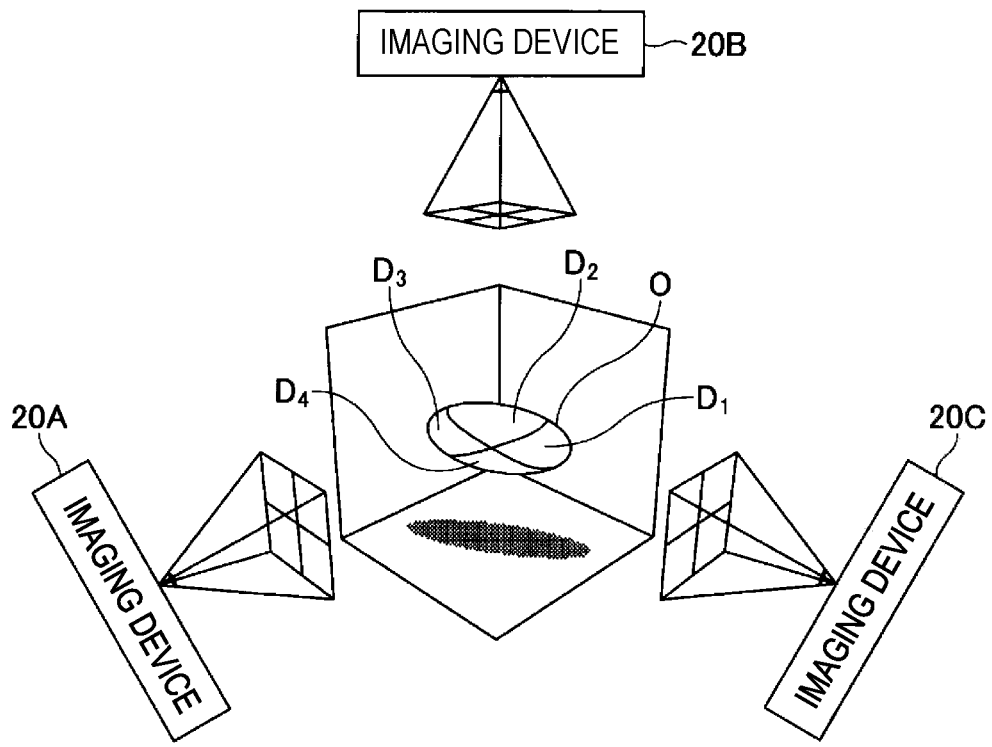
FIG. 2 is a diagram for illustrating an example of imaging through multiple imaging devices.

The storage unit 104 stores multiple images obtained by imaging multiple objects at individual time points. Here, according to this embodiment, for example, it is assumed that images obtained by imaging multiple objects in a closed space represented by $-1 \leq X, Y, Z \leq 1$ by three imaging devices at individual time points are stored. For example, as shown in FIG. 2, it is assumed that at each time point, imaging is performed by an imaging device 20A residing in front of an object O in the closed space, an imaging device 20B residing above the object O, and an imaging device 20C residing laterally to the object O. Note that in the example shown in FIG. 2, only one object O resides in the closed space. However, multiple objects reside in the closed space. Note that it is assumed that camera parameters (i.e., intrinsic parameters, and extrinsic parameters) of the imaging devices 20A to 20C are known.

As with the example shown in FIG. 2, if the visual axes of the respective imaging devices 20 are different from each other, the probability of obtaining two or more images with no overlap of object images increases even in a case where the number of objects is large and the objects are three-dimensionally close to each other, for example. Accordingly, the number of cases where the 3D position can be calculated by the position estimation unit 101, described later, increases. Note that the case where the number of imaging devices 20 is three is only an example. The number of imaging devices 20 may be four or more.

Here, as shown in FIG. 2, this embodiment assumes that the surface of each object is divided into four regions $D_1$ to $D_4$, and each imaging device 20 can image (observe) at least one of these four regions $D_1$ to $D_4$. The four regions $D_1$ to $D_4$ are assumed to be projected as pixel regions having luminances different from each other on an image. Here, for example, three axes of the object (ellipsoid) are called a major axis, a median axis and a minor axis in a descending order of length. In this case, as a method of division into the four regions $D_1$ to $D_4$, a method is conceivable where regions at least including the proximity of respective intersections (two points) with the major axis and the ellipsoidal surface are $D_1$ and $D_2$, and regions at least including the proximity of respective intersections (two points) with the median axis and the ellipsoidal surface are $D_4$ and $D_4$. Note that the regions $D_1$ to $D_4$ are obtained by dividing the surface of the ellipsoid with no overlap. The sum of the areas of the regions $D_1$ to $D_4$ is equal to the surface area of the ellipsoid.

The position estimation unit 101 uses the images stored in the storage unit 104 to estimate the 3D position from the 2D positions of the object on the images at the same time point. Here, this embodiment assumes that the 3D barycenter of the object is projected on the 2D barycenter of an object image (a two-dimensional combined pixel region) in the image, and the 2D barycenter is assumed as the 2D position of the object.

Figure 3:
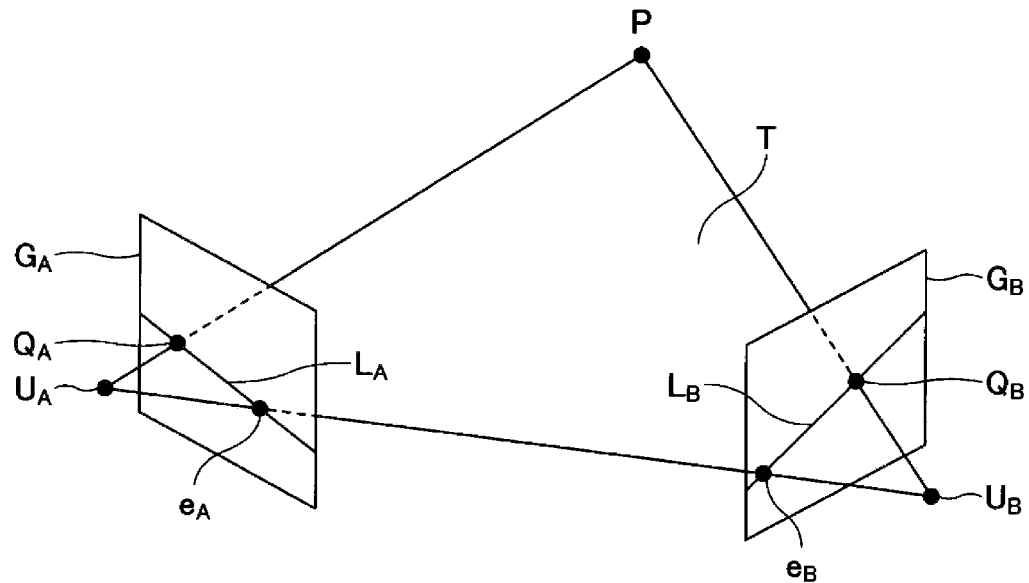
FIG. 3 is a diagram for illustrating an example of a process of 3D position projecting.

For example, the position of the imaging device 20A is assumed as $U_A$, and the position of the imaging device 20B is assumed as $U_B$. A projection process of the 3D position P of a certain object viewed from these imaging devices 20A and 20B is shown in FIG. 3. In the example shown in FIG. 3, a projection surface (image) of the imaging device 20A is represented as $G_A$, and a projection surface (image) of the imaging device 20B is represented as $G_B$. In this case, when the number of objects in the closed space is one, the position $U_A$ and the position $U_B$, the direction of the visual axes of the imaging device 20A and the imaging device 20B and the like are known (i.e., camera parameters are known). Accordingly, when the 2D positions $Q_A$ and $Q_B$ of the object are obtained, the 3D position P of the object can be calculated.

According to this embodiment, there are multiple objects that are of the identical type and cannot be discriminated from each other in the closed space. Consequently, by solving a correspondence problem of 2D positions between the multiple images at the same time point under an epipolar constraint condition, the correspondence of the 2D positions of the images of the identical object between the images is obtained. Here, an epipolar line $L_A$ is a line on the image $G_A$ that connects the 2D position $Q_A$ and a point (an epipole $e_A$) where a viewpoint (i.e., $U_S$) of the imaging device 20B is projected. Likewise, an epipolar line $L_B$ is a line on the image $G_B$ that connects the 2D position $Q_B$ and a point (an epipole es) where a viewpoint (i.e., $U_A$) of the imaging device 20A is projected. That is, the epipolar line is obtained by projecting, on the imaging device, the visual line when the object is viewed from the other imaging device. Accordingly, ideally, the 2D position should be on the epipolar line. However, because of an error or the like, the 2D position is not necessarily on the epipolar line in some cases. Even when the 2D position of the object is on the epipolar line but when the 3D position of another object is on an epipolar plane T, multiple 2D positions are on the same epipolar line. Accordingly, even under the epipolar constraint condition, the correspondence between the 2D positions of the images of the identical object cannot be obtained. Note that for meanings of terms and the like of the epipolar geometry, such as the epipole and the epipolar line, see Non-Patent Literature 3 described above and the like.

Accordingly, in this embodiment, it is assumed that the correspondence problem is solved by the position estimation unit 101 achieving a correspondence, as an identical object, between 2D positions having the minimum distance between a certain epipolar line and a certain 2D position on a certain image. Note that when the intrinsic parameters that are camera optical characteristics are the same between the imaging devices 20, the same result can be achieved in an ideal sense, with a correspondence based on the distance of any image.

That is, for instance, in the example shown in FIG. 3, two distances are conceivable that are the distance of the 2D position $Q_A$ from the epipolar line $L_A$ on the image $G_A$, and the distance of the 2D position $Q_B$ from the epipolar line $L_B$ on the image $G_B$. Meanwhile, when the two imaging devices 20A and 20B have the same camera intrinsic parameters, the 2D positions are the same between the images in an ideal sense. Accordingly, it is sufficient to consider any one of the images. The pair of the epipolar line and the 2D position having the minimum distance is assumed as the correspondence between 2D positions of the identical object. For instance, in the case of the example shown in FIG. 3, any one of the distance of the 2D position $Q_A$ from the epipolar line $L_A$ on the image $G_A$, and the distance of the 2D position $Q_B$ from the epipolar line $L_B$ on the image $G_B$ is considered. The pair of the 2D position of the 2D point on which the 3D point is projected, and the 2D position having the minimum distance from the corresponding epipolar line is assumed as the correspondence between 2D positions of the identical object. Accordingly, from each of images (at least two images) at the same time point, the 2D position of each object can be obtained. Consequently, the position estimation unit 101 can estimate the 3D position of the object from these 2D positions. Note that, for example, a known method, such as triangulation, may be used to estimate the 3D position.

Here, in the example shown in FIG. 3, for simplicity's sake, only one 3D point (P) is shown. When there are multiple objects, multiple 3D points ($P_1$, $P_2$, ...) reside. In this case, there are 2D positions ($Q_{A1}$, $Q_{A2}$, ..., or $Q_{B1}$, $Q_{B2}$, ...) of multiple 2D points where these 3D points are projected on corresponding images. For example, on the image $G_A$ where the 2D position $Q_A$ resides, there are as many epipolar lines as the number of 3D points ($L_{A1}$, $L_{A2}$, ...); the epipolar lines include the epipolar line $L_{A1}$ on which a 3D line connecting the viewpoint of the other imaging device 20B and the 3D point $P_1$ is projected, the epipolar line $L_{A2}$ on which a 3D line connecting the viewpoint of the other imaging device 20B and the 3D point $P_2$ is projected, in a similar manner, and the like. Consequently, the pair of the 2D position $Q_A$ and the epipolar line having the minimum distance is assumed as the correspondence of 2D positions of the identical object.

As described above, in order to estimate the 3D position of a certain object, 2D positions of the object are required to be obtained on at least two images at the same time point. Meanwhile, when multiple object images (combined pixel regions) overlap with each other on the image, the 2D barycenter of each object cannot be calculated. Accordingly, as shown in FIG. 2, it is preferable to image each object through multiple imaging devices 20 having different visual axes. Accordingly, the probability of obtaining two or more images with no overlap of object images increases, and the number of cases of allowing 3D position calculation can increase.

The feature amount extraction unit 102 extracts feature amounts from each object image on multiple images at the same time point. According to this embodiment, an attitude matrix is estimated using the feature amounts through a regression model. This embodiment herein assumes that the ellipsoid having three axes different in length from each other is projected approximately as an ellipse on an image. Accordingly, for example, as shown in FIG. 4, an elliptic region is included, on the image, as an object image O' on which a certain object O is projected.

Figure 4:
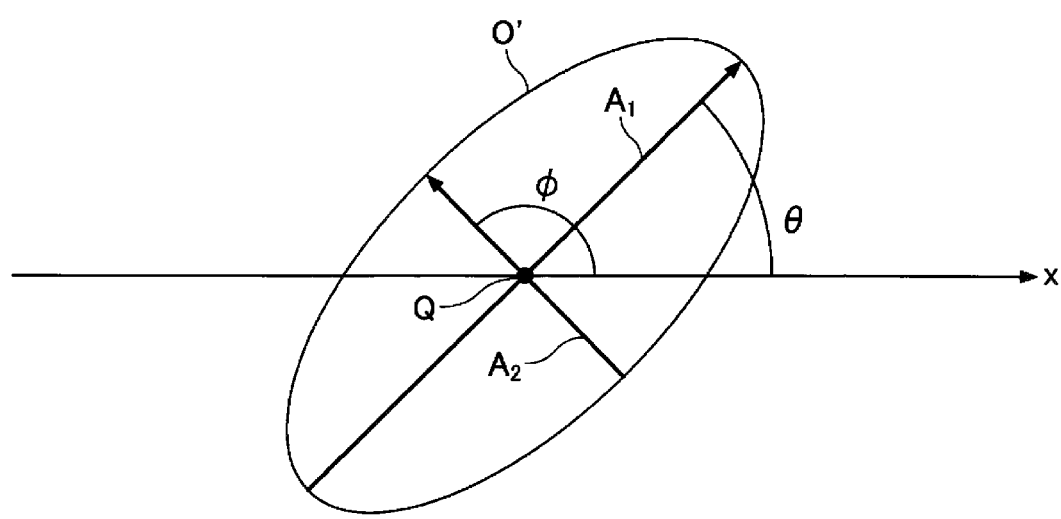
FIG. 4 is a diagram for illustrating an example of an object image of an ellipse.

In the example shown in FIG. 4, Q is the 2D barycenter of the object image O', and is a point on which the 3D barycenter of the ellipsoid (i.e., the object O) is projected. The angle θ between the positive sense of a major axis $A_1$ of the object image O' and the positive sense of the horizontal direction of the image, the angle φ between the positive sense of a minor axis $A_2$ of the object image O' and the positive sense of the horizontal direction of the image, the ratio $r=l_2/l_1$ between a length $l_1$ of the major axis $A_1$ and a length $l_2$ of the minor axis $A_2$, and the product $S=l_2 \times l_1$ of $l_2$ and $l_1$, are used as the feature amounts for estimating the attitude matrix. That is, the feature amount extraction unit 102 extracts the feature amounts (θ, φ, r, S) for each object image O'.

Here, in order to extract the angles θ and φ among the feature amounts (θ, φ, r, S) described above, the positive senses of the major axis $A_1$ and the minor axis $A_2$ are required to be determined. As described above, each object (ellipsoid) is divided into the four regions $D_1$ to $D_4$. These regions $D_1$ to $D_4$ are projected on the image as pixel regions having luminances different from each other. Accordingly, among the pixels included in the outer periphery of the object image O', the axis having the maximum distance between two pixels, which are freely selected, is assumed as the major axis $A_1$, and the positive sense may be determined on the basis of the difference in luminance between the end points of the major axis $A_1$. Likewise, the axis that passes through a 2D barycenter Q of the object image O' and is perpendicular to the major axis $A_1$ is assumed as the minor axis $A_2$, and the positive sense may be determined on the basis of the difference in luminance between the end points of the minor axis $A_2$.

For example, among intersections between the major axis and the ellipsoidal surface, the intersection included in the region $D_1$ is assumed as a first intersection, and the intersection included in the region $D_2$ is assumed as a second intersection, and the direction from the second intersection toward the first intersection can be determined as the positive direction of the major axis. For example, it is assumed that the pixel region where the region $D_1$ is projected has a higher luminance than the pixel region where the region $D_2$ is projected has. In this case, the positive direction of the major axis $A_1$ is determined as the direction from the end point having a lower luminance to the end point having a higher luminance. Likewise, for the direction of the minor axis $A_2$, the positive direction may be determined.

Note that, for example, if the minor axis $A_2$ corresponds to the minor axis of the ellipsoid, there can be no difference in luminance between the end points. In this case, a predetermined direction may be assumed as the positive direction of the minor axis $A_2$.

At a certain 3D position and attitude, the angles $\theta$ and $\phi$ of the major axis and the minor axis of the elliptic region on the image are defined to be always in specified directions, thereby achieving a one-to-one relationship between the feature amounts ($\theta$, $\phi$, r, S) and the attitude matrix. Accordingly, as described later, a regression model that calculates the attitude matrix using the 3D position and the feature amounts (more correctly, feature amounts obtained from the feature amounts) can be constructed.

Note that the method of determining the positive directions of the major axis $A_1$ and the minor axis $A_2$ described above is only one example. The positive directions of the major axis $A_1$ and the minor axis $A_2$ may be determined by another method. For example, in a case where unusual 3D points reside at the intersections between the surface of the ellipsoid and the positive directions of the three axes, the positive directions of the major axis $A_1$ and the minor axis $A_2$ can be determined using 2D points projected on the image (i.e., points where the unusual 3D points are projected on the image).

The attitude estimation unit 103 calculates the attitude matrix, through the regression model, using the feature amounts extracted by the feature amount extraction unit 102, and the 3D position estimated by the position estimation unit 101. Accordingly, the attitude of the three-dimensional object is estimated.

Here, the feature amounts extracted by the feature amount extraction unit 102 depend not only on the attitude of the object but also on the 3D position. Accordingly, not only the feature amounts extracted from multiple images at the same time point (three images in this embodiment) but also the 3D position estimated by the position estimation unit 101 is used as input data to be input into the regression model. The $\theta$ and $\phi$ included in the feature amounts are not input into the regression model as they are. The cosine and sine values are used instead. Consequently, provided that the feature amounts extracted from the images $G_A$, $G_B$ and $G_C$ are $(\theta_A, \phi_A, r_A, S_A)$, $(\theta_B, \phi_B, r_B, S_B)$ and $(\theta_C, \phi_C, r_C, S_C)$, respectively, and the 3D position is $P=(X_P, Y_P, Z_P)$, the input data to be input into the regression model is 21-dimensional data represented as follows. That is, the 21-dimensional data is represented as $(\cos\theta_A, \cos\phi_A, \sin\theta_A, \sin\phi_A, r_A, S_A, \cos\theta_B, \cos\phi_B, \sin\theta_B, \sin\phi_B, r_B, S_B, \cos\theta_C, \cos\phi_C, \sin\theta_C, \sin\phi_C, r_C, S_C, X_P, Y_P, Z_P)$. Note that output data from the regression model is the attitude matrix $R \in P^{3\times 3}$.

Figure 5:
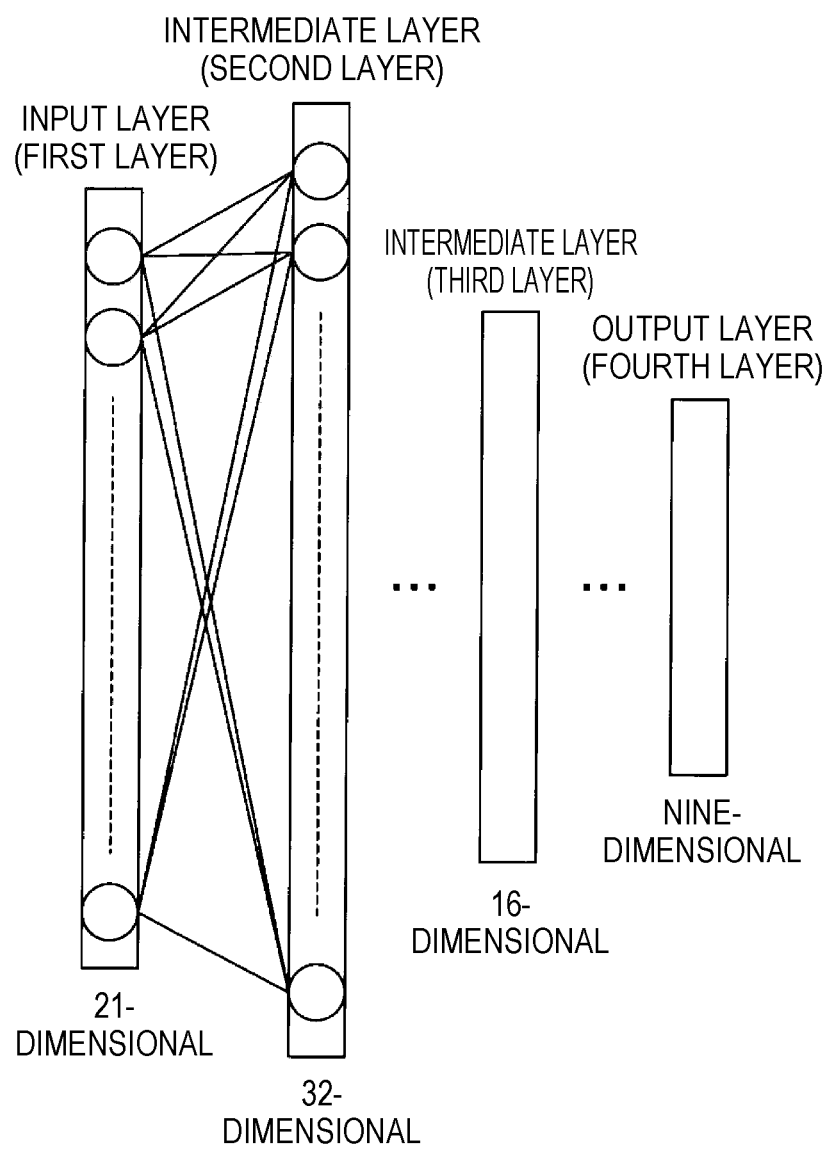
FIG. 5 is a diagram for illustrating an example of a neural network included in a regression model.

Here, the regression model includes a neural network that receives 21-dimensional data as input, and an orthonormalization processing unit that orthonormalizes the output of the neural network. The orthonormalization processing unit is required because the output of the neural network sometimes does not satisfy the condition of the attitude matrix (i.e., orthogonal matrix, and det|R|=1). FIG. 5 shows an example of the neural network included in the regression model. As shown in FIG. 5, the neural network included in the regression model includes a 21-dimensional input layer (i.e., an input layer having 21 units), a 32-dimensional intermediate layer, a 16-dimensional intermediate layer, and a nine-dimensional output layer. The first to fourth layers are fully connected layers. Linear transformation is used for the activating functions of the input layer and the output layer. ReLU (Rectified Linear Unit) is used for the activating functions of the intermediate layers. Note that the neural network shown in FIG. 5 is only one example. The dimensions (the number of units) of the intermediate layers, the number of intermediate layers, the activating functions and the like can be appropriately changed.

The regression model described above may be learned by a supervised learning method, for example. However, according to this embodiment, the learning method is devised. Here, for example, if it is configured such that the feature amounts from all the images at the same time point are input into the regression model, the object images overlap with each other, part of input data into the regression model includes a defect in case no feature amount is obtained from a certain image, and the attitude matrix cannot be estimated. Typically, the 3D position of the object can be calculated when there are two or more images with object images not overlapping with each other. Likewise, it is accordingly conceivable that the 3D attitude can be calculated when there are two or more images with object images not overlapping with each other. In order to support a case where the object images overlap with each other, typically, all regression models into which the feature amounts of only any two images have been input and which support every overlapping case are required. In this embodiment, for saving the effort, in order to allow the attitude matrix to be calculated using a single regression model even with occurrence of an overlap, the following devices are applied to a dataset for the neural network learning.

Typically, the dataset for learning is created, with feature amounts obtained from each of images obtained by the imaging devices imaging each individual object at various 3D positions and attitudes, and the 3D positions being adopted as input data, and attitude matrices representing the attitudes being adopted as training data. In this case, the feature amounts of the image where the object images overlap with each other cannot be obtained. Accordingly, this embodiment assumes that the values of the feature amounts when the object images overlap with each other are fixed to predetermined values out of the range of the values of feature amounts obtained from the image where the object images do not overlap with each other (i.e., out of the range of the upper limit value and the lower limit value). That is, according to this embodiment, learning is performed using a dataset that includes not only typical learning data but also learning data assuming a case where the object images overlap with each other. Here, the typical learning data is learning data that adopts, as input data, the feature amounts and the 3D position obtained from each of the images, and adopts the attitude matrix as training data. The learning data assuming the case where the object images overlap with each other is learning data that adopts, as input data, the feature amounts and the 3D position that are fixed to predetermined values, and adopts the attitude matrix as training data. The functions obtainable by the neural network through learning can be many-to-one mapping. Accordingly, the regression model can be constructed even by learning with such a dataset for learning. Note that in a case where the object images of the images overlap with each other when the attitude is actually estimated (i.e., when the regression model including a learned neural network is used), the values of the feature amounts of the images are input as the predetermined values described above into the regression model.

<Estimation of 3D Position and Attitude>

Next, a flow of processes in a case where the position and attitude of each object are estimated by the estimation device 10 according to this embodiment is described. Note that a case of estimating the position and attitude of the object using three images $G_A$ to $G_C$ (i.e., images taken by the imaging devices 20A to 20C) at a certain time point is hereinafter described.

<<Position Estimation Process>>

Figure 6:
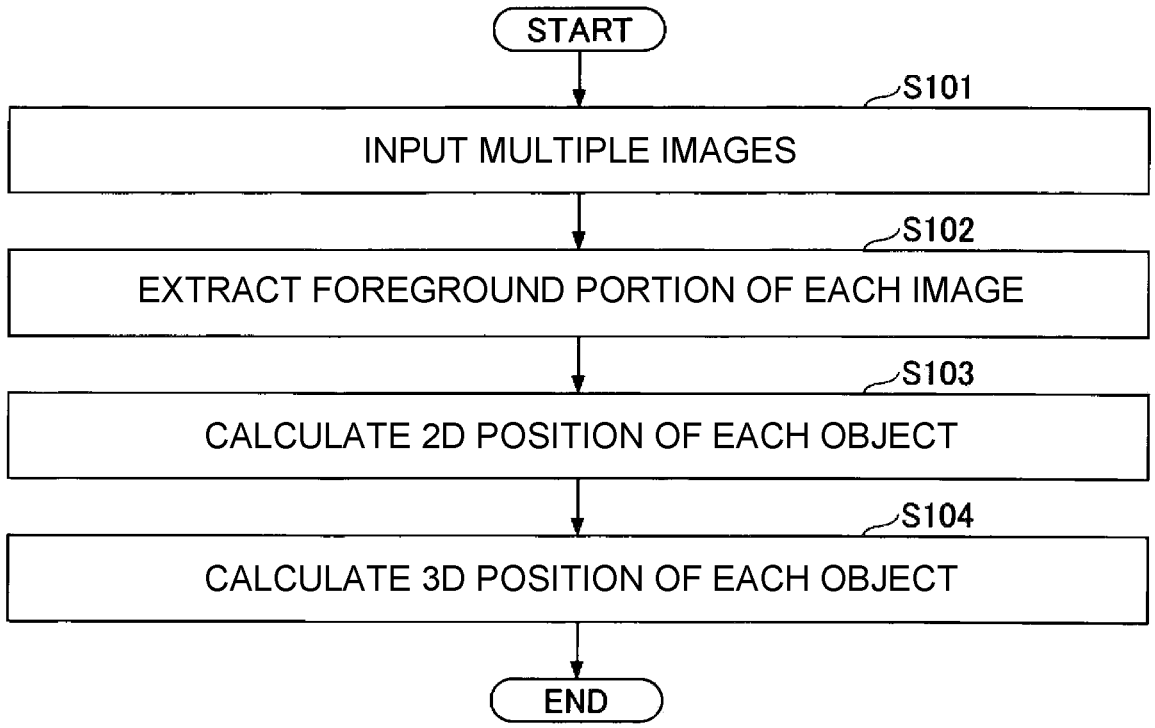
FIG. 6 is a flowchart showing an example of a flow of a position estimation process according to this embodiment.

Hereinafter, the flow of a position estimation process for estimating the 3D position of each object is described with reference to FIG. 6. FIG. 6 is a flowchart showing an example of the flow of the position estimation process according to this embodiment.

First, the position estimation unit 101 obtains the images $G_A$ to $G_C$ at the time point concerned from the storage unit 104 (step S101).

Next, the position estimation unit 101 extracts foreground portions representing object images on which the objects are projected from each of the images $G_A$ to $G_C$ (step S102). That is, the position estimation unit 101 cuts out the foreground portions from the images $G_A$ to $G_C$. These foreground portions are also passed to the feature amount extraction unit 102. Note that if the object images do not overlap with each other, these foreground portions are elliptic regions (however, if the object images overlap with each other, the detection is possible by the fact that the number of combined regions in the image is smaller than that in another image having no overlap; in such a case, the correspondence problem may be solved between images that do not overlap with each other). If the object images do not overlap with each other, it is assumed which foreground portion is of which object image is known or can be easily estimated.

Next, the position estimation unit 101 calculates the 2D positions of the respective objects from the foreground portions (object images) extracted in step S102 described above (step S103). As described above, the position estimation unit 101 calculates the 2D barycenters of the respective object images, assumes these 2D barycenters as the 2D positions, and associates the 2D positions having minimum distance between the epipolar line and the 2D position between two images with each other, as the 2D positions of the images of the identical object. Note that as described above, when the object images overlap with each other, the 2D barycenter cannot be calculated. It is assumed that in this step, for individual object images, the object images do not overlap with each other in at least two images, and the 2D barycenters (i.e., 2D positions) can be calculated between at least two images.

Lastly, the position estimation unit 101 estimates the 3D position of each object from the 2D positions of the corresponding object obtained in step S103 described above (step S104). As described above, for example, a known method, such as triangulation, may be used to estimate the 3D position. These 3D positions are passed to the attitude estimation unit 103.

<<Attitude Estimation Process>>

Figure 7:
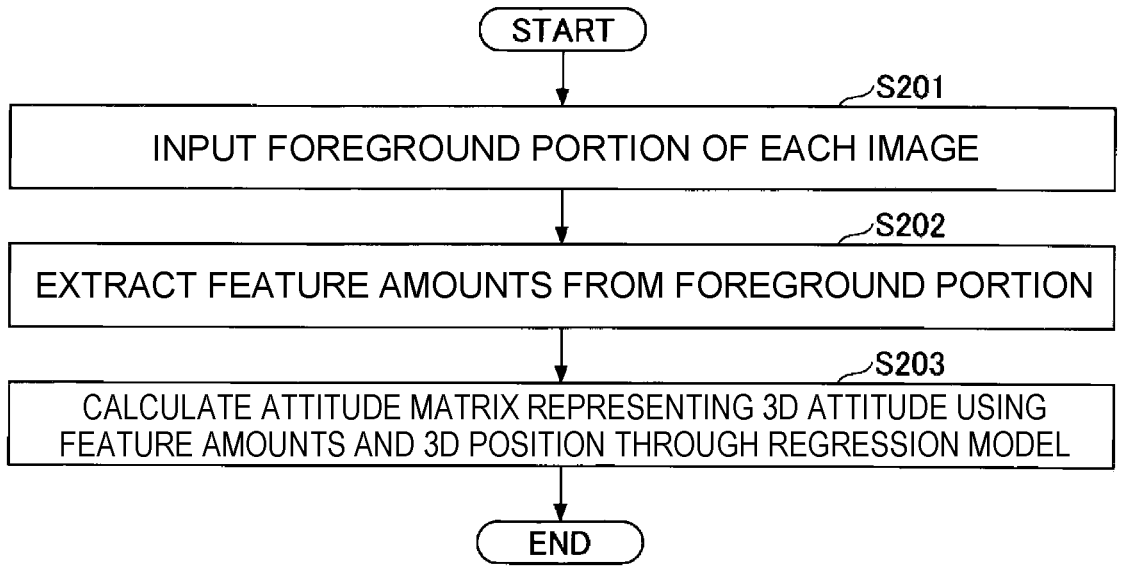
FIG. 7 is a flowchart showing an example of a flow of an attitude estimation process according to this embodiment.

Hereinafter, the flow of an attitude estimation process for estimating the attitude of each object is described with reference to FIG. 7. FIG. 7 is a flowchart showing an example of a flow of the attitude estimation process according to this embodiment.

First, the feature amount extraction unit 102 receives the foreground portions passed from the position estimation unit 101 as input (step S201).

Next, for each foreground portion input in step S201 described above, on an object-by-object basis, when the foreground portions corresponding to the respective objects are elliptic regions (i.e., when the object images do not overlap with each other), the feature amount extraction unit 102 extracts the feature amounts from the elliptic regions (step S202). Accordingly, on an object-by-object basis, first feature amounts extracted from the foreground portion of the image $G_A$, second feature amounts extracted from the foreground portion of the image $G_B$, and third feature amounts extracted from the foreground portion of the image $G_C$ are obtained. Note that as described above, if the object images overlap with each other, the feature amount extraction unit 102 sets the values of the feature amounts to predetermined values. For example, when the overlap occurs between object images at the foreground portion of the image $G_A$, the feature amount extraction unit 102 sets the values of the first feature amounts respectively to predetermined values.

Lastly, on an object-by-object basis, the attitude estimation unit 103 calculates the attitude matrix that represents the attitude of the object through the regression model, using the 3D position (the 3D position of the object concerned) passed from the position estimation unit 101, and the feature amounts (the first feature amounts to third feature amounts of the object concerned) extracted in step S202 described above (step S203). Note that as described above, for example, the attitude estimation unit 103 creates 21-dimensional input data using the 3D position, and the first feature amounts to the third feature amounts, and inputs the 21-dimensional input data into the regression model, thereby obtaining the attitude matrix R. Accordingly, the attitude represented by the attitude matrix R is estimated as the attitude of the object concerned.

<Evaluation of Estimation Result>

Hereinafter, evaluation of a result of estimation of a 3D position and an attitude of each object at a certain time point by the estimation device 10 according to this embodiment is described. Note that the neural network shown in FIG. 5 is used as the neural network included in the regression model used for this evaluation. In the neural network learning, mean squared error (MSE) is used for the loss function, and Adam is used for the optimization method. The number of mini batches is 90, and the number of epochs is 100.

Figure 8:
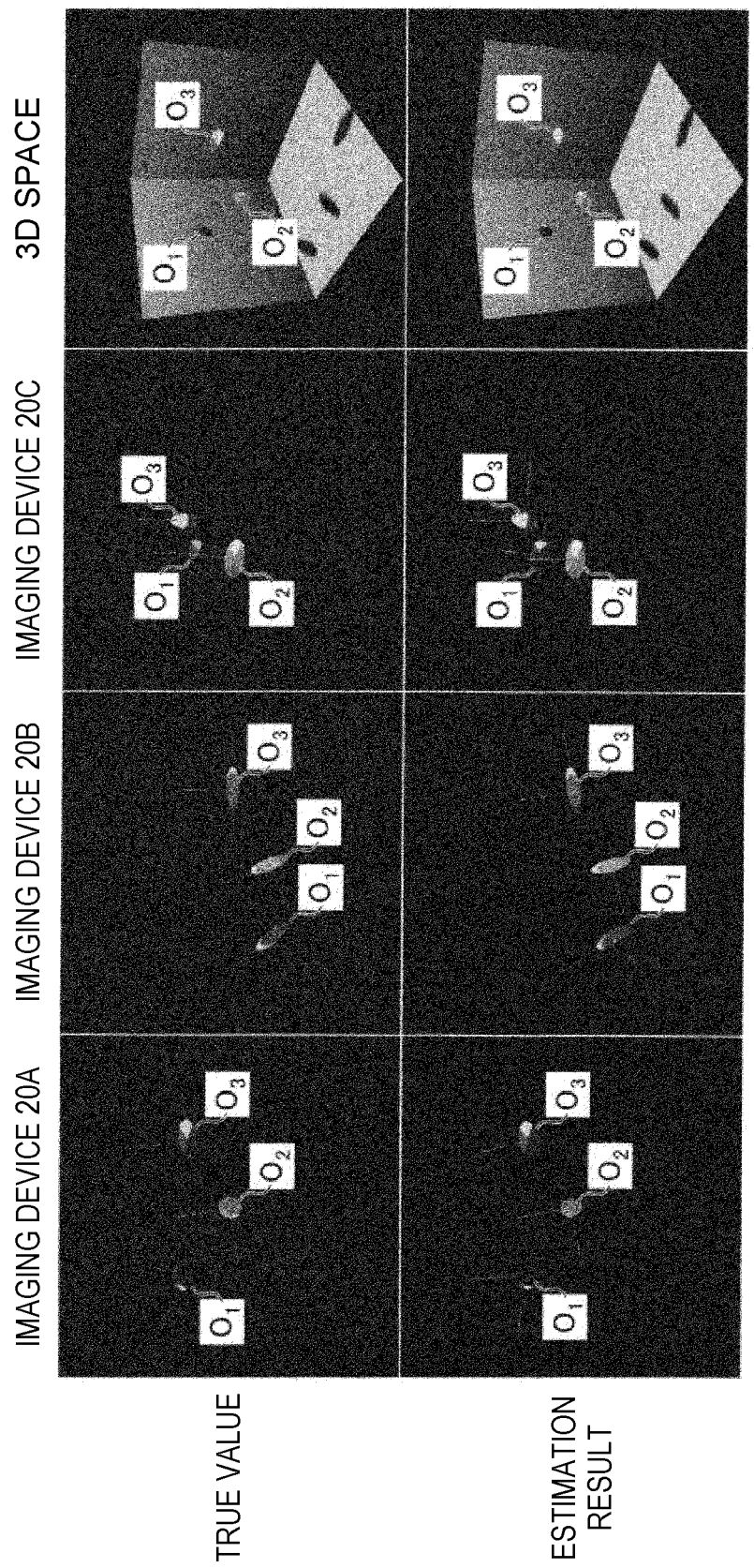
FIG. 8 shows an example of an estimation result of 3D positions and attitudes (I).

Here, a result of estimation of the 3D positions and attitudes of the objects $O_1$ to $O_3$ at a certain time point by the estimation device 10 according to this embodiment is shown in FIG. 8. In FIG. 8, the upper row indicates true values, and the lower row indicates estimation results. From the left, the position and attitude of each object in a projection surface of the imaging device 20A, the position and attitude of each object in a projection surface of the imaging device 20B, the position and attitude of each object in a projection surface of the imaging device 20C, and the position and attitude of each object in the 3D space are shown. As shown in FIG. 8, by comparing the true values with the estimation results, it is shown that both the 3D positions and the attitudes can be accurately estimated even with slight errors.

Figure 9:
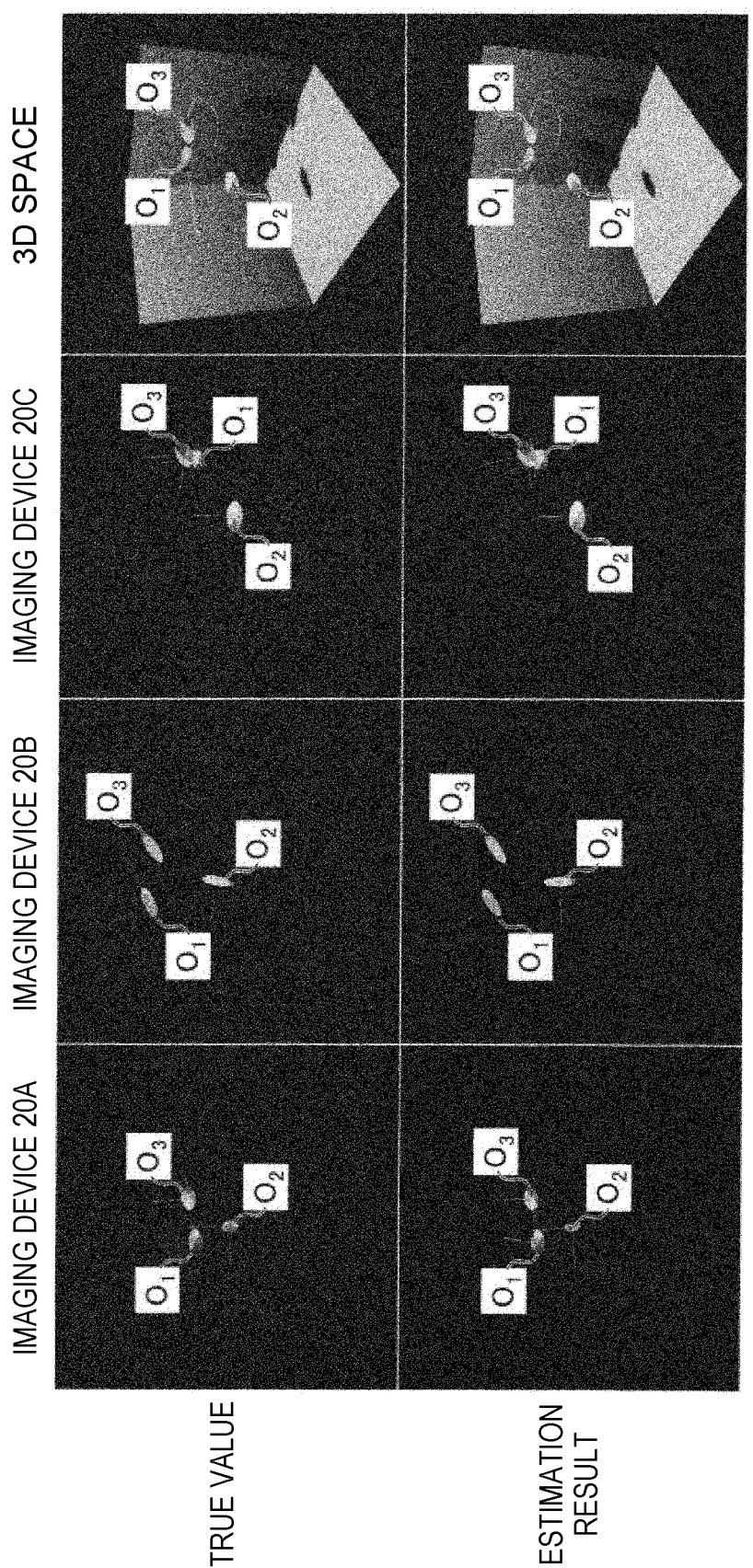
FIG. 9 shows an example of an estimation result of 3D positions and attitudes (II).

A result in a case where parts of object images overlap with each other when the 3D positions and attitudes of the objects $O_1$ to $O_3$ at a certain time point by the estimation device 10 according to this embodiment are estimated is shown in FIG. 9. Also in FIG. 9, the upper row indicates true values, and the lower row indicates estimation results. From the left, the position and attitude of each object in a projection surface of the imaging device 20A, the position and attitude of each object in a projection surface of the imaging device 20B, the position and attitude of each object in a projection surface of the imaging device 20C, and the position and attitude of each object in the 3D space are shown. As shown in FIG. 9, the objects $O_1$ and $O_3$ partially overlap with each other in the projection surface of the imaging device 20C. Note that, for example, in this case, when two imaging devices 20 including the imaging device 20C are used, the 2D positions of the objects $O_1$ and $O_3$ cannot be calculated. However, use of the three imaging devices 20 as in this embodiment can calculate the 2D positions of the objects $O_1$ and $O_3$.

As shown in FIG. 9, even when the object images overlap with each other, it is shown that both the 3D positions and the attitudes can be accurately estimated even with slight errors.

Note that according to this evaluation, images at 1000 time points (total 3000 images) are taken by each of the three imaging devices 20A to 20C. Although the object images overlap with each other in one image, images at 71 time points where no object images overlap between the remaining two images are obtained. Consequently, it can be said that, in this case, in comparison with use of two imaging devices 20, use of the three imaging devices 20 can calculate new 2D positions which are 0.071 of the entirety. However, the extent to which the new 2D positions can be calculated depends on moving images used for evaluation.

As described above, use of the estimation device 10 according to this embodiment can accurately estimate the 3D positions and attitudes of multiple 3D objects that are of the identical type and are incapable of being discriminated from each other in the closed space, using multiple images. Note that this embodiment assumes that the shape of the object is the ellipsoid. Shapes whose 3D attitudes can be calculated using the feature amounts obtained from images of silhouettes of objects can be similarly used as approximated 3D shapes other than ellipsoids.

<Hardware Configuration>

Figure 10:
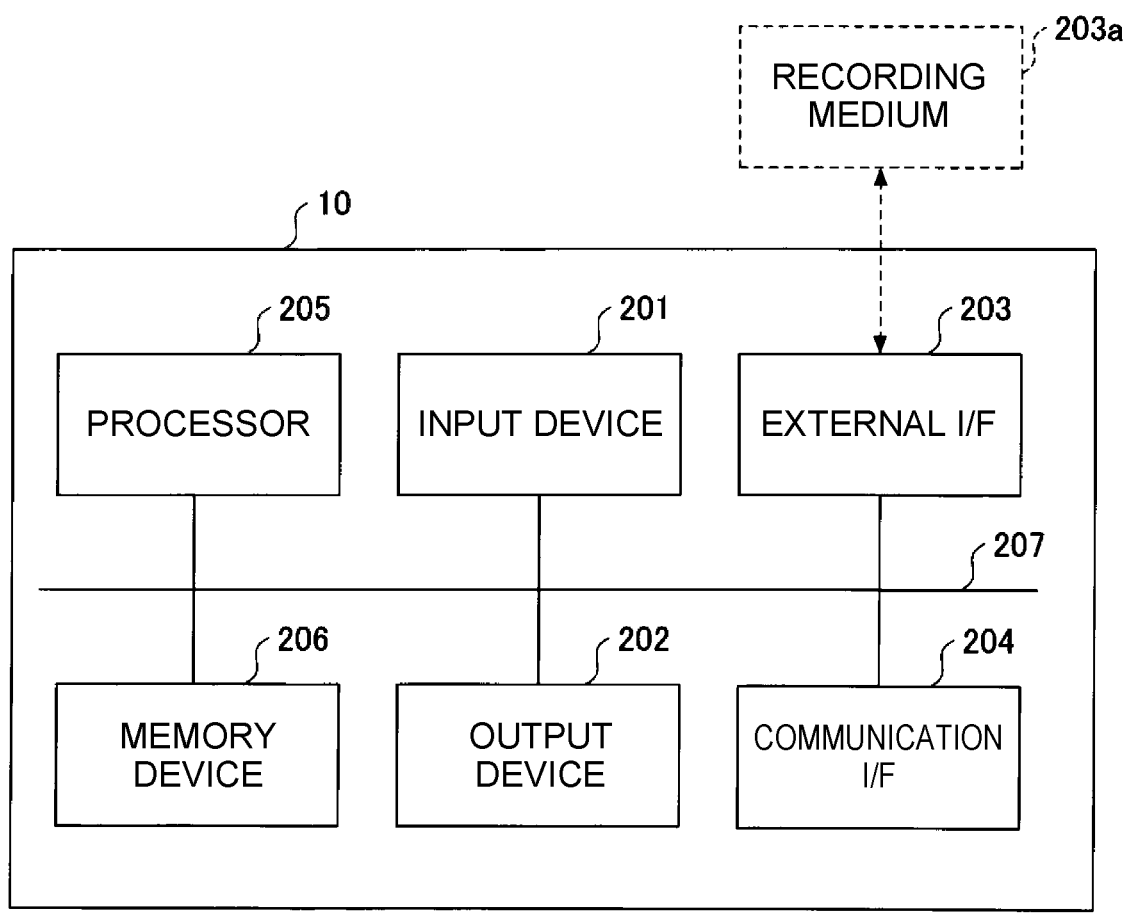
FIG. 10 shows an example of a hardware configuration of the estimation device according to this embodiment.

Lastly, a hardware configuration of the estimation device 10 according to this embodiment is described with reference to FIG. 10. FIG. 10 shows an example of the hardware configuration of the estimation device 10 according to this embodiment.

As shown in FIG. 10, the estimation device 10 according to this embodiment is achieved by a typical computer or computer system, and includes an input device 201, a display device 202, an external I/F 203, a communication I/F 204, a processor 205, and a memory device 206. These pieces of hardware are communicably connected to each other via a bus 207.

The input device 201 is, for example, a keyboard, a mouse, a touch panel, or the like. The display device 202, for example, is a display or the like. Note that it may be configured such that the estimation device 10 does not include at least one of the input device 201 and the display device 202.

The external I/F 203 is an interface with an external device. The external device may be a recording medium 203a or the like. The estimation device 10 can perform, for example, reading from and writing to the recording medium 203a via the external I/F 203. The recording medium 203a may store, for example, one or more programs that achieve the respective function units (the position estimation unit 101, the feature amount extraction unit 102, and the attitude estimation unit 103) that the estimation device 10 includes.

Note that the recording medium 203a is, for example, a CD (Compact Disc), a DVD (Digital Versatile Disk), an SD (Secure Digital) memory card, a USB (Universal Serial Bus) memory card or the like.

The communication I/F 204 is an interface for connecting the estimation device 10 to the communication network. Note that the one or more programs that achieve the respective function units included in the estimation device 10 may be obtained (downloaded) from a predetermined server device or the like via the communication I/F 204.

The processor 205 is various types of operation devices, for example, a CPU (Central Processing Unit), a GPU (Graphics Processing Unit), etc. The function units that the estimation device 10 includes are achieved by, for example, processes that the one or more programs stored in the memory device 206 or the like cause the processor 205 to execute.

The memory device 206 is various types of storage devices, such as an HDD (Hard Disk Drive), an SSD (Solid State Drive), a RAM (Random Access Memory), a ROM (Read Only Memory), and a flash memory, for example. The storage unit 104 that the estimation device 10 includes can be achieved using the memory device 206, for example. Note that for example, the storage unit 104 may be achieved using the storage device (e.g., a database server or the like) connected to the estimation device 10 via the communication network.

The estimation device 10 according to this embodiment includes the hardware configuration shown in FIG. 10. Accordingly, the position estimation process and the attitude estimation process described above can be achieved. Note that the hardware configuration shown in FIG. 10 is only an example. The estimation device 10 may have another hardware configuration. For example, the estimation device 10 may include multiple processors 205, and include multiple memory devices 206.

The present invention is not limited to the specifically disclosed embodiment described above. Various modifications, changes, combination with known techniques and the like are allowed without departing from the description of Claims.

REFERENCE SIGNS LIST

10 Estimation device
101 Position estimation unit
102 Feature amount extraction unit
103 Attitude estimation unit
104 Storage unit
201 Input device
202 Display device
203 External I/F
203a Recording medium
204 Communication I/F
205 Processor
206 Memory device
207 Bus

The invention claimed is:

1. An estimation method causing a computer to execute:
calculating, using a plurality of images obtained by a plurality of imaging devices imaging a three-dimensional space in which a plurality of objects reside, representative points of pixel regions representing the plurality of objects among pixel regions of the images;
estimating positions of the plurality of objects in the three-dimensional space, based on the representative points;
extracting predetermined feature amounts from image regions representing the plurality of objects; and
estimating attitudes of the plurality of objects in the three-dimensional space, through a preliminarily learned regression model, using the positions of the plurality of objects and the predetermined feature amounts.

2. The estimation method according to claim 1,
wherein the regression model is learned using a dataset that includes:
first learning data that adopts the predetermined feature amounts extracted from the images obtained by the plurality of imaging devices imaging the three-dimensional space in which the plurality of objects reside, and the positions of the plurality of objects in the three-dimensional space, as input data, and the first learning data that adopts attitude matrices representing the attitudes of the plurality of objects, as training data; and
second learning data that adopts feature amounts set to be predetermined values as the predetermined feature amounts when the image regions overlap with each other among two or more objects of the plurality of objects, and the positions of the plurality of objects in the three-dimensional space, as input data, and adopts the attitude matrices representing the attitudes of the plurality of objects as training data, and
when at least parts of the image regions representing the plurality of objects among two or more objects of the plurality of objects overlap with each other, the extracting further comprises adopting the predetermined values as the feature amounts.

3. The estimation method according to claim 1,
wherein the plurality of objects represent objects that are of an identical type and cannot be discriminated from each other, and
the estimating further comprises solving, between two images among the images, a correspondence problem of the representative points of the image regions representing the respective objects of the plurality of objects, under an epipolar constraint condition, to identify a pair of the representative points corresponding to an identical object between the two images, and estimating a position of the identical object from the identified pair of the representative points.

4. The estimation method according to claim 3,
wherein the estimating comprises identifying representative points having a minimum sum of distances from an epipolar line between the two images, as the pair of the representative points corresponding to the identical object.

5. The estimation method according to claim 1,
wherein when the image region representing an object of the plurality of objects can be approximated as an elliptic region, the extracting further comprises extracting a first angle between a positive sense of a major axis of an ellipse represented by the elliptic region and a positive sense of a horizontal direction of an image associated with the object, a second angle between a positive sense of a minor axis of the ellipse and the positive sense of the horizontal direction of the image, a ratio between a length of the major axis and a length of the minor axis, and a product of the length of the major axis and the length of the minor axis, as the predetermined feature amounts.

6. The estimation method according to claim 5,
wherein the extracting further comprises determining a positive direction of the major axis and a positive direction of the minor axis, using differences between luminances of pixel regions representing respective four regions that divide a surface of the object among the pixel regions of the image.

7. An estimation device comprising a processor configured to execute a method comprising:
calculating, using a plurality of images obtained by a plurality of imaging devices imaging a three-dimensional space in which a plurality of objects reside, representative points of pixel regions representing the plurality of objects among pixel regions of the images;
estimating positions of the plurality of objects in the three-dimensional space, based on the representative points;
extracting predetermined feature amounts from image regions representing the plurality of objects; and
estimating attitudes of the plurality of objects in the three-dimensional space, through a preliminarily learned regression model, using the positions estimated by the position estimation means, and the predetermined feature amounts.

8. A computer-readable non-transitory recording medium storing computer-executable program instructions that when executed by a processor cause for causing a computer to execute a method comprising:
calculating, using a plurality of images obtained by a plurality of imaging devices imaging a three-dimensional space in which a plurality of objects resides, representative points of pixel regions representing the plurality of objects among pixel regions of the images;
estimating positions of the plurality of objects in the three-dimensional space, based on the representative points;
extracting predetermined feature amounts from image regions representing the plurality of objects; and
estimating attitudes of the plurality of objects in the three-dimensional space, through a preliminarily learned regression model, using the positions estimated by the position estimation means, and the predetermined feature amounts.

9. The estimation method according to claim 2,
wherein the plurality of objects represents objects that are of an identical type and cannot be discriminated from each other, and
the estimating further comprises solving, between two images among the images, a correspondence problem of the representative points of the image regions representing the respective objects, under an epipolar constraint condition, to identify a pair of the representative points corresponding to an identical object between the two images, and estimating a position of the identical object from the identified pair of the representative points.

10. The estimation device according to claim 7,
wherein the regression model is learned using a dataset that includes:
first learning data that adopts the predetermined feature amounts extracted from the images obtained by the plurality of imaging devices imaging the three-dimensional space in which the plurality of objects reside, and the positions of the plurality of objects in the three-dimensional space, as input data, and the first learning data that adopts attitude matrices representing the attitudes of the plurality of objects, as training data; and
second learning data that adopts feature amounts set to be predetermined values as the predetermined feature amounts when the image regions overlap with each other among two or more objects of the plurality of objects, and the positions of the plurality of objects in the three-dimensional space, as input data, and adopts the attitude matrices representing the attitudes of the plurality of objects as training data, and when at least parts of the image regions representing the plurality of objects among two or more objects of the plurality of objects overlap with each other, the extracting further comprises adopting the predetermined values as the predetermined feature amounts.

11. The estimation device according to claim 7, wherein the plurality of objects represents objects that are of an identical type and cannot be discriminated from each other, and the estimating further comprises solving, between two images among the images, a correspondence problem of the representative points of the image regions representing the respective objects, under an epipolar constraint condition, to identify a pair of the representative points corresponding to an identical object between the two images, and estimating a position of the identical object from the identified pair of the representative points.

12. The estimation device according to claim 7, wherein when the image region representing an object of the plurality of objects can be approximated as an elliptic region, the extracting further comprises extracting a first angle between a positive sense of a major axis of an ellipse represented by the elliptic region and a positive sense of a horizontal direction of an image associated with the object, a second angle between a positive sense of a minor axis of the ellipse and the positive sense of the horizontal direction of the image, a ratio between a length of the major axis and a length of the minor axis, and a product of the length of the major axis and the length of the minor axis, as the predetermined feature amounts.

13. The computer-readable non-transitory recording medium according to claim 8, wherein the regression model is learned using a dataset that includes:

first learning data that adopts predetermined the predetermined feature amounts extracted from the images obtained by the plurality of imaging devices imaging the three-dimensional space in which the plurality of objects reside, and the positions of the plurality of objects in the three-dimensional space, as input data, and the first learning data that adopts attitude matrices representing the attitudes of the plurality of objects, as training data; and second learning data that adopts feature amounts set to be predetermined values as the predetermined feature amounts when the image regions overlap with each other among two or more objects of the plurality of objects, and the positions of the plurality of objects in the three-dimensional space, as input data, and adopts the attitude matrices representing the attitudes of the plurality of objects as training data, and when at least parts of the image regions representing the plurality of objects among two or more objects of the plurality of objects overlap with each other, the extracting further comprises adopting the predetermined values as the predetermined feature amounts.

14. The computer-readable non-transitory recording medium according to claim 8, wherein the plurality of objects represents objects that are of an identical type and cannot be discriminated from each other, and the estimating further comprises solving, between two images among the images, a correspondence problem of the representative points of the image regions representing the respective objects, under an epipolar constraint condition, to identify a pair of the representative points corresponding to an identical object between the two images, and estimating a position of the identical object from the identified pair of the representative points.

15. The computer-readable non-transitory recording medium according to claim 8, wherein when the image region representing an object of the plurality of objects can be approximated as an elliptic region, the extracting further comprises extracting a first angle between a positive sense of a major axis of an ellipse represented by the elliptic region and a positive sense of a horizontal direction of an image associated with the object, a second angle between a positive sense of a minor axis of the ellipse and the positive sense of the horizontal direction of the image, a ratio between a length of the major axis and a length of the minor axis, and a product of the length of the major axis and the length of the minor axis, as the predetermined feature amounts.

16. The estimation device according to claim 10, wherein the regression model is learned using a dataset that includes:

first learning data that adopts predetermined feature amounts extracted from the images obtained by the plurality of imaging devices imaging the three-dimensional space in which the plurality of objects reside, and the positions of the plurality of objects in the three-dimensional space, as input data, and the first learning data that adopts attitude matrices representing the attitudes of the plurality of objects, as training data; and second learning data that adopts the predetermined feature amounts set to be predetermined values as the predetermined feature amounts when the image regions overlap with each other among two or more objects of the plurality of objects, and the positions of the plurality of objects in the three-dimensional space, as input data, and adopts the attitude matrices representing the attitudes of the plurality of objects as training data, and when at least parts of the image regions representing objects among two or more objects of the plurality of objects overlap with each other, the extracting further comprises adopting the predetermined values as the predetermined feature amounts.

17. The estimation device according to claim 11, wherein the estimating comprises identifying representative points having a minimum sum of distances from an epipolar line between the two images, as the pair of the representative points corresponding to the identical object.

18. The estimation device according to claim 12, wherein the extracting further comprises determining a positive direction of the major axis and a positive direction of the minor axis, using differences between luminances of pixel regions representing respective four regions that divide a surface of the object among the pixel regions of the image.

19. The computer-readable non-transitory recording medium according to claim 13, wherein the plurality of objects represents objects that are of an identical type and cannot be discriminated from each other, and the estimating further comprises solving, between two images among the images, a correspondence problem of the representative points of the image regions representing the respective objects, under an epipolar constraint condition, to identify a pair of the representative points corresponding to an identical object between the two images, and estimating a position of the identical object from the identified pair of the representative points.

20. The computer-readable non-transitory recording medium according to claim 14,
wherein the estimating comprises identifying representative points having a minimum sum of distances from an epipolar line between the two images, as the pair of the representative points corresponding to the identical object.

* * * * *